(12) United States Patent
Grivogiannis

(10) Patent No.: US 11,363,110 B2
(45) Date of Patent: Jun. 14, 2022

(54) CONTENT DISTRIBUTION SYSTEMS

(71) Applicant: First Canadian Benefits Inc., Toronto (CA)

(72) Inventor: George Grivogiannis, Toronto (CA)

(73) Assignee: First Canadian Benefits Inc., Toronto (CA)

( * ) Notice: Subject to any disclaimer, the term of this patent is extended or adjusted under 35 U.S.C. 154(b) by 291 days.

(21) Appl. No.: 16/682,427

(22) Filed: Nov. 13, 2019

(65) Prior Publication Data

US 2021/0144225 A1 May 13, 2021

(51) Int. Cl.
| | |
|---|---|
| G06F 15/16 | (2006.01) |
| H04L 67/564 | (2022.01) |
| H04L 9/40 | (2022.01) |
| H04L 67/568 | (2022.01) |
| G06F 16/25 | (2019.01) |
| G06F 21/62 | (2013.01) |

(52) U.S. Cl.
CPC ........ *H04L 67/2819* (2013.01); *G06F 16/252* (2019.01); *G06F 21/6218* (2013.01); *H04L 63/0884* (2013.01); *H04L 67/2842* (2013.01)

(58) Field of Classification Search
CPC ............. H04L 67/2819; H04L 67/2842; H04L 63/0884
USPC ...................... 726/3; 709/203, 217, 218, 219
See application file for complete search history.

(56) References Cited

U.S. PATENT DOCUMENTS

| | | | | |
|---|---|---|---|---|
| 7,380,280 | B2 * | 5/2008 | de Jong ................. | H04L 65/80 726/26 |
| 7,890,656 | B2 * | 2/2011 | Nakamichi ........... | H04L 47/125 709/241 |
| 8,452,650 | B2 * | 5/2013 | Paunikar ................ | G06Q 30/02 705/14.1 |
| 8,706,547 | B2 * | 4/2014 | Paunikar ................ | G06Q 30/02 705/14.1 |
| 8,751,613 | B1 * | 6/2014 | Medved ............. | H04L 67/1021 709/220 |
| 8,756,319 | B2 * | 6/2014 | Waites ................ | H04L 63/0876 709/225 |
| 8,861,525 | B1 * | 10/2014 | Durand ............... | H04L 61/2557 370/392 |
| 8,925,022 | B2 * | 12/2014 | Carbunar ........... | H04N 21/2225 725/93 |
| 8,938,765 | B2 * | 1/2015 | Benya ................ | H04N 21/4828 725/86 |
| 9,100,856 | B2 * | 8/2015 | Lee ..................... | H04L 67/1021 |
| 9,113,182 | B2 * | 8/2015 | Lemmons .......... | H04N 21/2543 |

(Continued)

*Primary Examiner* — Moustafa M Meky
(74) *Attorney, Agent, or Firm* — DLA Piper LLP (US)

(57) ABSTRACT

An example of an apparatus to connect devices to distribute content is provided. The apparatus includes a communication interface to communicate with a first device and a second device. The apparatus also includes an administration engine to manage a subscription service. In addition, the apparatus includes a memory storage unit to store a first record associated with the first device and a second record associated with the second device. The apparatus further includes an authentication engine to authenticate a request from the first device for content based on the first record. Furthermore, the apparatus includes a selection engine to select the second device based on the request. The second device is to generate the content and to transmit the content to the first device.

20 Claims, 10 Drawing Sheets

(56) References Cited

U.S. PATENT DOCUMENTS

| | | | | |
|---|---|---|---|---|
| 9,380,323 | B2* | 6/2016 | Carbunar | H04N 21/23106 |
| 10,154,111 | B2* | 12/2018 | Karasaridis | H04L 61/1511 |
| 10,277,500 | B2* | 4/2019 | Medved | H04L 41/12 |
| 10,375,210 | B2* | 8/2019 | Gupta | G06F 21/10 |
| 2006/0026692 | A1* | 2/2006 | Lakhani | G06F 21/31 |
| | | | | 726/28 |
| 2009/0327244 | A1* | 12/2009 | Rizal | G06F 16/1834 |
| | | | | 709/204 |
| 2012/0185950 | A1* | 7/2012 | Li | H04L 67/2842 |
| | | | | 726/29 |
| 2019/0098006 | A1* | 3/2019 | Kim | H04W 12/06 |
| 2019/0166121 | A1* | 5/2019 | Colby | H04W 4/14 |

* cited by examiner

CONTENT DISTRIBUTION SYSTEMS

BACKGROUND

Content may be generated by portable electronic devices such as cameras, smart phones, and tablets. With the improvement of camera technology becoming more compact and portable, users are able to generate high quality content from almost any location and to capture almost any event. The ease of generating content provided by portable electronic devices has led to the proliferation of platforms for sharing the information. Platforms may include various social media providers where a user may capture an image or video using a portable electronic device and allow the user to post the image or video to be shared with other individuals. With the increase in connectivity of devices via high speed network connections, the sharing of content such as images and videos has become more widespread.

BRIEF DESCRIPTION OF THE DRAWINGS

Reference will now be made, by way of example only, to the accompanying drawings in which.

DETAILED DESCRIPTION

Figure 1:
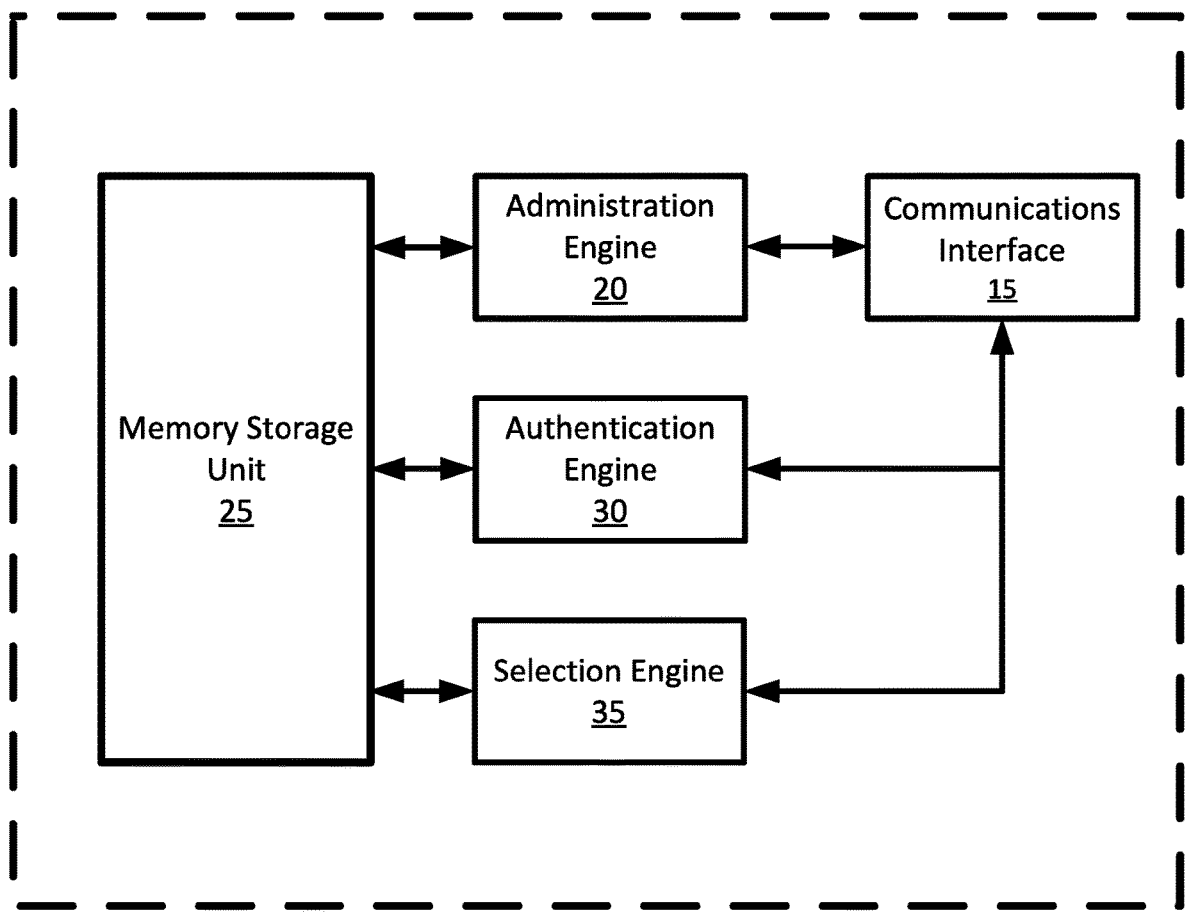
FIG. 1 is a block diagram of an example apparatus to connect devices to distribute content from one device to another.

Portable electronic devices having cameras that are capable of capturing high quality images and videos may be widely accepted and used in daily life. Furthermore, the portable electronic devices are also increasingly connected to networks to provide quick and convenient ways to share information with other individuals. In particular, social media platforms, such as FACEBOOK, INSTAGRAM, PINTEREST, and TWITTER, allow for near instantaneous sharing of such images and videos from almost any location worldwide.

Individuals may want to experience unique environments or to observe an event or view images or video from a location somewhere in the world. However, due to constraints on travel, such as cost and time, it may be impractical for the individual to experience the environment, observe an event, or visit the location to make first hand observations. Furthermore, the individual may not be able travel to a location due to physical limitations, such as a disability, or travel restrictions, such as political instability or natural phenomena. The individual may turn to a social media platform, such as one of the above mentioned social media platforms to satisfy a desire for that experience; however, the experience that the individual is searching for may not be publicly available. For example, if the individual is searching for an image of a view from the top of a newly constructed skyscraper, the image may not be available online, especially if there are no public viewing areas from where the individual is seeking an image. As another example, the individual may wish to experience a future event from a specific vantage point, such as an upcoming music concert from the front row. Accordingly, an individual looking to experience such an event may find it very difficult or impossible. In addition, there may be individuals with a desire to create content of various experiences or events to share with others. Such individuals may be producing content as a hobby or to demonstrate their skills as they build an artistic portfolio.

In the present example, an apparatus, method, and system are provided to allow for an individual to request content of an experience and to connect that individual with another who is willing to provide the requested content. The request is not limited and may be targeted to another individual having a device capable of capturing the experience as outlined in the request. In some examples, the individual may also offer compensation to the second individual. In other examples, the request for content may be broadcasted to multiple content generating devices where the person controlling each content generating device may decide to make a bid to capture the content. It is to be appreciated that many different applications are contemplated. For example, the apparatus, method, and system may provide a way for a user to attend a location that the user cannot be attend or a that the user does not wish to attend in person due to travel times or scheduling, such as meetings, sales trips, or distant education. In other examples, the apparatus, method, and system may be commercialized by companies wanting to outsource information gathering, such as new organizations or investigation firms.

Referring to FIG. 1, an example of an apparatus to connect devices to distribute content from one device to another is generally shown at 10. The apparatus 10 may include additional components, such as various interfaces to communicate with other devices, and further input and output devices to interact with a user or an administrator with access to control the apparatus 10. In the present example, the apparatus 10 includes a communications interface 15, an administration engine 20, a memory storage unit 25, an authentication engine 30, and a selection engine 35. Although the present example shows the administration engine 20, the authentication engine 30, and the selection engine 35 as separate components, in other examples, the administration engine 20, the authentication engine 30, and the selection engine 35 may be part of the same physical component such as a microprocessor configured to carry out multiple functions, or combined in a plurality of microprocessors.

The communications interface 15 is to communicate with a devices connected to a network. The exact number of devices with the communications interface 15 communicates is not limited. In addition, the devices may be connected via different networks accessible by the communications interface 15. The types of devices in communication with the apparatus 10 is also not particularly limited. For example, some devices may be to send a request to the apparatus 10 for content and other devices may be used to generate content. It is to be appreciated that in some instances, a device may be used as both types of devices. As a specific example, a smartphone may be used to request content to display to a user and may also be used to generate content with a camera. In particular, the devices may be part of a service or social networking platform where users to the service may request other users to generate specific content. The users may also review other requests and fulfil requests to generate content.

The manner by which the communications interface 15 transmits and receives data is not particularly limited. In the present example, the apparatus 10 may connect to devices via a network link. Accordingly, the communications interface 15 may be a network interface communicating over the Internet. In other examples, the communication interface 15 may directly connect to the devices via a wire or other direct communication link, such as a via a local area network, when the devices are to be confined to a limited geographical area.

In the present example, the data exchanged between the apparatus 10 and connected devices is not particularly limited. For example, the data may include requests for content from a device. The data may also include the response to the request from another device. In some examples, the apparatus 10 may also receive the generated content, such as images and videos for storage in the memory storage unit 25 and for subsequent transmission to another device.

The administration engine 20 is to manage a subscription service to which a user associated with a device may be a part of. In the present example, the subscription service may be for a content generation service, where the administration engine 20 is to manage aspects of the subscription service such as the membership types of an account associated a specific device and the types of services to which the account is entitled. The administration engine 20 may maintain the accounts locally or in other examples, the administration engine 20 may use other platforms that allow a social network sign-in process, such as GOOGLE or FACEBOOOK. In the present example, the apparatus 10 may also be authorized to carry out several administrative roles associated with the subscription service. For example, the administration engine 20 may add and remove users of the devices from the subscription service and set permissions of users of other devices and/or assign roles to the other devices on the network within the conditions outlined in the subscription service. For example, some subscribing devices may be entitled to request content and may not be allowed to generate any content for distribution. As another example, some services associated with the subscription service may charge a fee. Therefore, the administration engine 20 may maintain a record of the accounts of various, where the record may include information such as the amount of credits available on the account to purchase services such as the generation of content.

The subscription service maintained by the administration engine 20 is not limited and may include various features depending on the specific application or services provided. Therefore, it is to be appreciated that the administration engine 20 may be adapted to multiple different types of subscription services. In the present example, the subscription service may be associated with a service that connects account holders seeking content, such as videos or images, with other account holders interested in generating content, such as amateur or professional photographers and filmmakers. The subscription service may also include various options that provide varying levels of control and management for each account that is to be set prior to the start of the subscription service.

By managing a record that includes a balance of credits, the administration engine 20 may also be used to manage a marketplace for this type of content. It is to be appreciated that credits may have a monetary value and be purchase by account holders that request content and redeemed by account holders that receive credits for services involving the generation of the content. Accordingly, the cost of generating the content, such as the time and equipment involved as well as potential travel to a location, may be recovered. In addition, content generation may be a revenue source to some of the content producers. As such, each person generating content may build a portfolio or receive a peer review that is managed by the administration engine 20. The individual requesting content may use peer reviews or the portfolio associated with a producer of content to determine a preference automatically or provide a user selection option when multiple content generating devices respond to the request.

In some examples, the administration engine 20 may be used manage membership types by designating a device associated with an account holder as a requesting device, a content generating device, or a multiuse device. The designation of the devices is not particularly limited and may be based on information received from the device at the time the device is enrolled into the subscription service and the account holder associated with the device is assigned a membership type. For example, the account holder may register a device for the subscription service via an enrollment process where a step involves a selection of the membership type. In other examples, some membership types may further involve a vetting process. For example, the subscription service managed by the administration engine 20 may attempt to maintain a standard of quality where the technical specifications of the device and/or the skill of the account holder associated with the device are evaluated.

In the case where the device is designated as a requesting device, such as when the account holder associated with the device has a basic membership type, the device may not be permitted to generate content. Instead, the device may be permitted to purchase credits from the subscription service. The credits may subsequently be used to offer compensation to operators of the content generating devise to produce content. For example, the individual with a basic membership may submit a request for content, such as a sunset over a water horizon, and offer a number of credits for the content. The amount of credits offered is not particularly limited and may vary depending on the difficulty of obtaining the content, as well as the requested quality of the content. In some examples, the offer may be a pre-determined amount set by a photographer, a videographer, or other party involved with the production of content. In other examples, the offer may be a bid open to multiple producers associated with various content generating devices. In other examples, the administration engine 20 may optionally log a transaction and record the amount of compensation paid by the requesting device to the content generating device for the content requested without actually handling any payment or exchange of credits.

In the case where the device is designated as a content generating device, such as when the account holder associated with the device has membership type that allows for content generation, the device may be permitted to generate content to be provided to other devices that are part of the subscription service. In particular, the content generating device may receive credits to their account via a transfer recorded by the administration engine 20 prior to or after content is generated and provided to the requesting device. In some examples, the administration engine 20 may review the technical specifications of the content generating device to ensure that predetermined threshold performance metrics are met. For example, the device may be evaluated to comply with a minimum resolution of the content or minimum frame speed for video. Other technical specifications may include various optical features of cameral system, such as aperture settings or zoom settings, and the availability of peripheral equipment such as various lighting apparatus. The manner by which the technical specifications are received by the administration engine 20 are not limited and may involve user entry by the account holder or receiving device identification information directly from a compatible device. The account holder associated with the device may also be evaluated by the administration engine 20 prior providing a content generating device designation. The manner by which the account holder associated with the device is evaluated is not particularly limited and may involve a competency test or a peer review process or an accreditation from an acceptable source, such as from a recognized organization in the field. The administration engine 20 may also monitor the content generating device to ensure that the standards are met as well as provide a mechanism of removing or restricting permissions of the account holder if standards are not being met.

In the case where the device is designated as a multiuse device, the device may be used to carry out both the functions of a requesting device and a content generating device. Therefore, the multiuse device may be associated with an account holder permitted to generate content for others while at the same time be permitted to request content from other account holders of the subscription service.

Although the above examples discuss three types of devices managed by the administration engine 20 based on characteristics of the account holders associated with the device, it is to be appreciated that the administration engine 20 may manage more or less types of devices. For example, the subscription service may have a single membership type class instead of multiple different device types. In such an example, all account holders of the subscription service may be able to generate content and request content. As another example, the subscription service may have more membership types, such as multiple types of membership for content generating content, where each type of membership may indicate a characteristic of the content producer. The content producers may be divided geographically where the membership type may be limited to an area where content may be generated. In other examples, the content producers may also be divided by experience or skill. For examples, the new account holders of the subscription service capable of generating content may be provided with a novice or probationary designation such that an account holder making a request may know that the content producer is not experienced and may not provide the best content. Alternatively, experienced content producers may receive an expert or advanced designation to indicate that the content producer is likely to provide good content. The manner by which a content producer receives the expert or advanced designation is not limited and may involve evaluation of the amount and quality of the content produced for the subscription service and/or the reviews from requestors to whom the content was provided.

The memory storage unit 25 is to store records of accounts of the subscription service. Each record may be associated with an account holder as well as devices of the account holder. The manner by which the memory storage unit 25 stores the records is not particularly limited. In the present example, the memory storage unit 25 may maintain a database to store the records. Each record may include information about an account holder and the associated device. For example, the record may include identification information such as address, email, and phone numbers of the account holder as well as identifying information of the devices belonging to the account holder. The record may also include financial information such as credit card information, banking information, or other payment information. In addition, the record may also include a balance to track the amount of credits available to the account holder. In other examples, the record may also point to content previously produced and provide historical information about the account holder, such as purchases and credit transfers.

In the present example, the memory storage unit 25 is not particularly limited and may include a non-transitory machine-readable storage medium that may be, for example, an electronic, magnetic, optical, or other physical storage device. In the present example, the memory storage unit 25 is a persistent memory that may also store an operating system that is executable by a processor to provide general functionality to the apparatus 10. For example, the operating system may provide functionality to additional applications operating on the apparatus 10 in addition to an application for distributing content. Examples of operating systems include WINDOWS, MACOS, IOS, ANDROID, LINUX, and UNIX. The memory storage unit 25 may additionally store instructions to operate at the driver level to communicate with other components and peripheral devices of the apparatus 10.

The authentication engine 30 is to authenticate a request for content from a requesting device. The request may include information such as the type of content being requested. For example, the request may include a description of an event as well as a geographical location or vantage point from which an image or video of the event is to be captured. Continuing with the example above, the request may include a description of an event such as a sunset over water, and that the event be captured from a beach in California. The request may also include information about how much compensation the requesting device is offering for the content. The compensation included in the request may be a specified amount of credits. Accordingly, the authentication engine 30 may authenticate the request by processing the information in the request based on the record of the account holder associated with the device from which the request originated. For example, the authentication engine 30 may determine if the account holder associated with the requesting device is authorized to make the request. Some membership types may limit the type of request available, such a parental locking feature to avoid requesting inappropriate content when the age of the user is not verified. Other types of membership types may limit the quality or type of the content requested to some accounts. As an example, some accounts may be limited to requesting image content and other accounts may be limited to lower quality videos. It is to be appreciated with the benefit of this description, that an account holder may upgrade their membership type by paying additional fees to the subscription service. The authentication engine 30 may also determine if the offer for compensation in a request is valid. In particular, the authentication engine 30 may check to determine that sufficient funds in the account making the request for content to cover the offer in the request.

The selection engine 35 is to select a content generating device based on the request from the requesting device. The specific manner by which the selection is made is not particularly limited. In an example, the selection engine 35 may generate a list of prospective content generating devices based on their ability to generate the content described in the request. The selection engine 35 may then present the options to the requesting device where a selection may be made based on the user's preference. The plurality of content generating devices in the list presented by the selection engine 35 is not limited and may be pre-determined. In some examples, the list is a static list of all content generating devices capable of generating content for the type of membership of the account holder associated with the requesting device. The list may be sorted by various factors, such as proximity to the content being requested. In other examples, the responses to the request from each content generating device may include an offer or price for which the user of the content generating device will accept to generate the content. The selection engine 35 may also suggest or automatically select the content generating device based and a predetermined set of rules, such as a lowest price. In other examples, the list of content generating devices may be presented to the requesting device which may prompt the user to make a selection manually.

Once the selection engine 35 has selected the content generating device, the content generating device is to generate the content described in the request. The manner by content generating device generates the content is not limited and may vary due to the different features of the content capturing device as well as differences in the operator of the content generating device. In addition, the content is dependent on the information of the request. The format of the content generated is also not limited. For example, the content may be an image or video. It is to be appreciated that other formats are also possible, such as three-dimensional images or video, or a virtual reality format. In further examples, the content may also be an audio file or a three-dimensional printable file.

Once the content is generated, the content generating device is to transmit that content to the first device. The manner by which the content is transmitted is not particularly limited. In some examples, the content may be transmitted from the content generating device to the apparatus 10 for subsequent distribution to the requesting device. Accordingly, the apparatus 10 may act as a proxy to protect the identities of the requesting device and the content generating device to maintain confidentiality of for both parties. In addition, the apparatus 10 may store a content on the memory storage unit 25 for subsequent verification and as evidence in the event that a party raises an issue with the subscription service, such as the request being not properly fulfilled. In other examples, the content generating device may directly communicate with the requesting device and provide the content without involving the apparatus 10. In such examples, one or both of the content generating device and the requesting device may provide a verification message to the apparatus 10 for record keeping purposes.

Upon delivery of the content from the content generating device to the requesting device either directly or via the apparatus 10, the administration engine 20 may update the records of account holders associated with the content generating device and the requesting device. In particular, the administration engine 20 may transfer credits from the account holders associated with the requesting device to the account holders associated with the content generating device. In addition, the administration engine 20 may create a log entry in each of the accounts to document the historical transactions that have occurred. Although the present example shows the administration engine 20 updating the records of the accounts after the delivery of the content has been completed, other examples may update the records earlier or later. For example, the records may be updated upon receiving the request and/or selecting the content generating device. In other examples, all the transactions may be logged and the administration engine 20 may be used to update all records periodically, such as once a day, once a week, or at another predetermined frequency.

Figure 2:
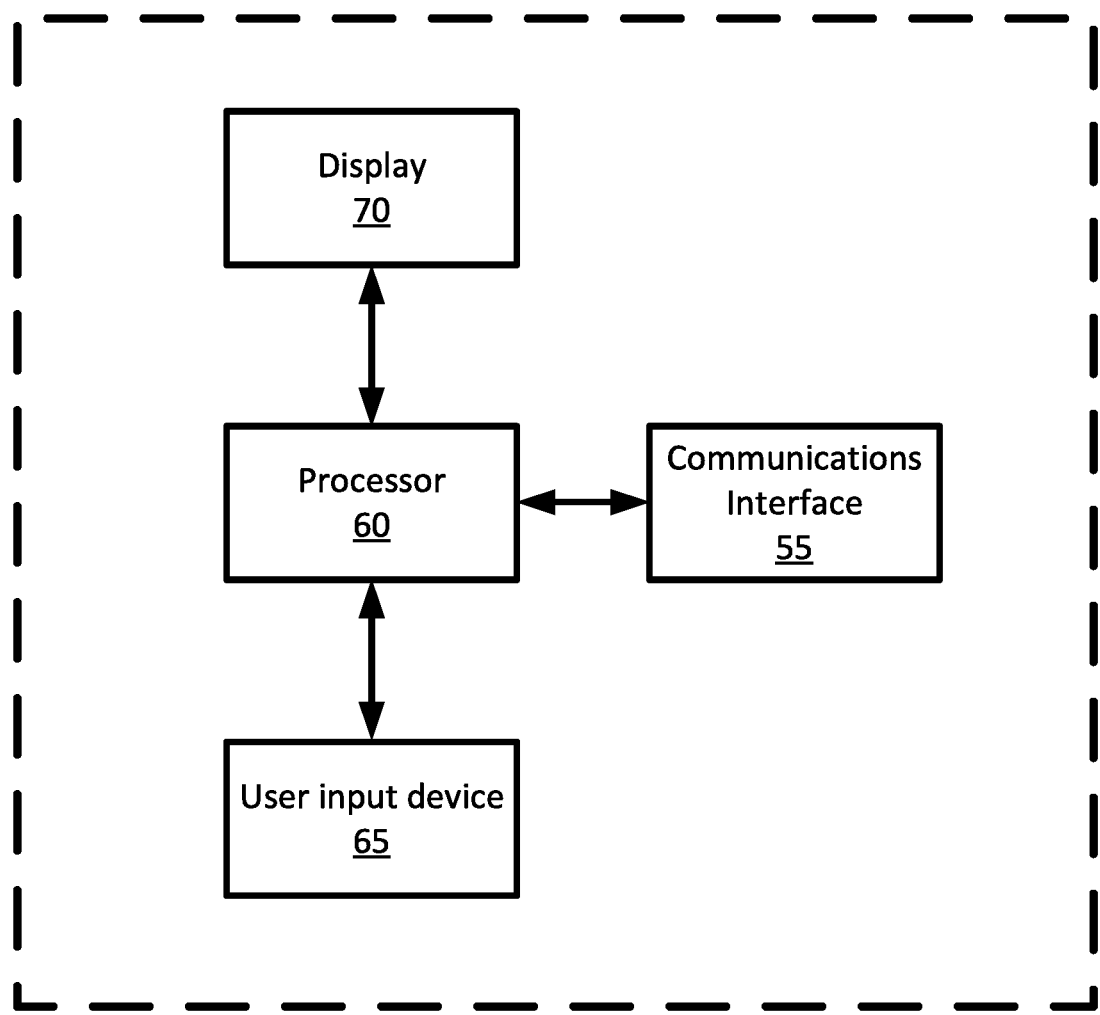
FIG. 2 is a block diagram of a requesting device to transmit a request for content based on user input to a content generating device.
Figure 2:
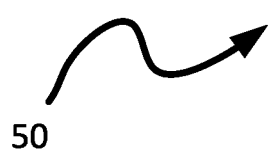

Referring to FIG. 2, an example of a requesting device to work in cooperation with the apparatus 10 to receive distributed content from another device is generally shown at 50. The requesting device 50 may include additional components, such as various interfaces to communicate with other devices, and further input and output devices to interact with a user or account holder of the subscription service. In the present example, the requesting device 50 may be any type of electronic device, such as a smartphone, a tablet, a laptop, a desktop computer, a television, virtual reality device, or any other device capable of receiving user input to and generating user output. The requesting device 50 includes a communications interface 55, a processor 60, a user input device 65, and a display 70.

The communications interface 55 is to communicate with other devices on a network, such as the apparatus 10. The manner by which the communications interface 55 receives and sends data is not particularly limited. In the present example, the communications interface 55 performs similar functions in the requesting device 50 as the communications interface 15 performs in the apparatus 10. The data exchanged via the communications interface 55 is also not particularly limited and may include transmitting a request for content and receiving a response to the request which may include the content requested.

In the present example, the processor 60 may include a central processing unit (CPU), a graphics processing unit (GPU), a microcontroller, a microprocessor, a processing core, a field-programmable gate array (FPGA), an application-specific integrated circuit (ASIC), or similar. The processor 60 may execute various instructions either stored on a local memory storage unit (not shown) or received via the communications interface 55 from an external memory source, such as a cloud server. The processor 60 may execute instructions to carry out processes such as handling requests and generating output to a user based on the content received in response to a request.

The user input device 65 is to receive input from a user, which may include details about content that the user requests. It is to be appreciated that other types of user input may also be received via the user input device 65 and that the user input device 65 is not particularly limited. For example, the user input device 65 may be a device to interact with a human user, such as a keyboard, a pointer device, a touch sensitive device, a button, a microphone, or any other device to generate control signals in response to the actions of a user. In further examples, the user input device 65 may be the touch sensitive portion of a display 70 disposed on the requesting device 50 to provide a touchscreen interface.

In other examples, the user input device 65 may be another communications interface to communicate with a connected device or a network, such as the Internet, where user input is received from another electronic device. For example, the requesting device 50 may be connected to a peripheral device, such as a smartwatch, another smartphone or another type of device which may be used to provide the control commands for the requesting device 50.

The display 70 is to display output to a user. In the present example where the requesting device 50 is a tablet or smartphone, the display 70 may be overlaid with a touch membrane which may function as the user input device 65. The display 70 is not particularly limited and the manner by which the display 70 generates output to the user may involve any type of display device. For example, the display 70 may include one or more light emitters and modulating components such as an array of light emitting diodes (LED), liquid crystals, plasma cells, or organic light emitting diodes (OLED). Other types of light emitters and modulators may also be substituted. Furthermore, the display 70 may be combined with the user input device 65 by overlaying a touch membrane to provide a touchscreen unit capable of providing output to the user and receiving input from the user. In such examples, the touch membrane is not limited to any type of touch membrane and may include resistive technology, surface acoustic wave technology, capacitive technology, infrared technology, or optical imaging technology.

In other examples, the display 70 may be substituted with another output device where the content requested by the user is not a conventional image or video. For example, in cases where the content requested is virtual reality or three-dimensional content, the display 70 may be substituted with an alternative device, such as a stereoscopic headset with orientation sensors. In other examples, if the content requests is for only audio content, the display 70 may be substituted with a speaker.

Figure 3:
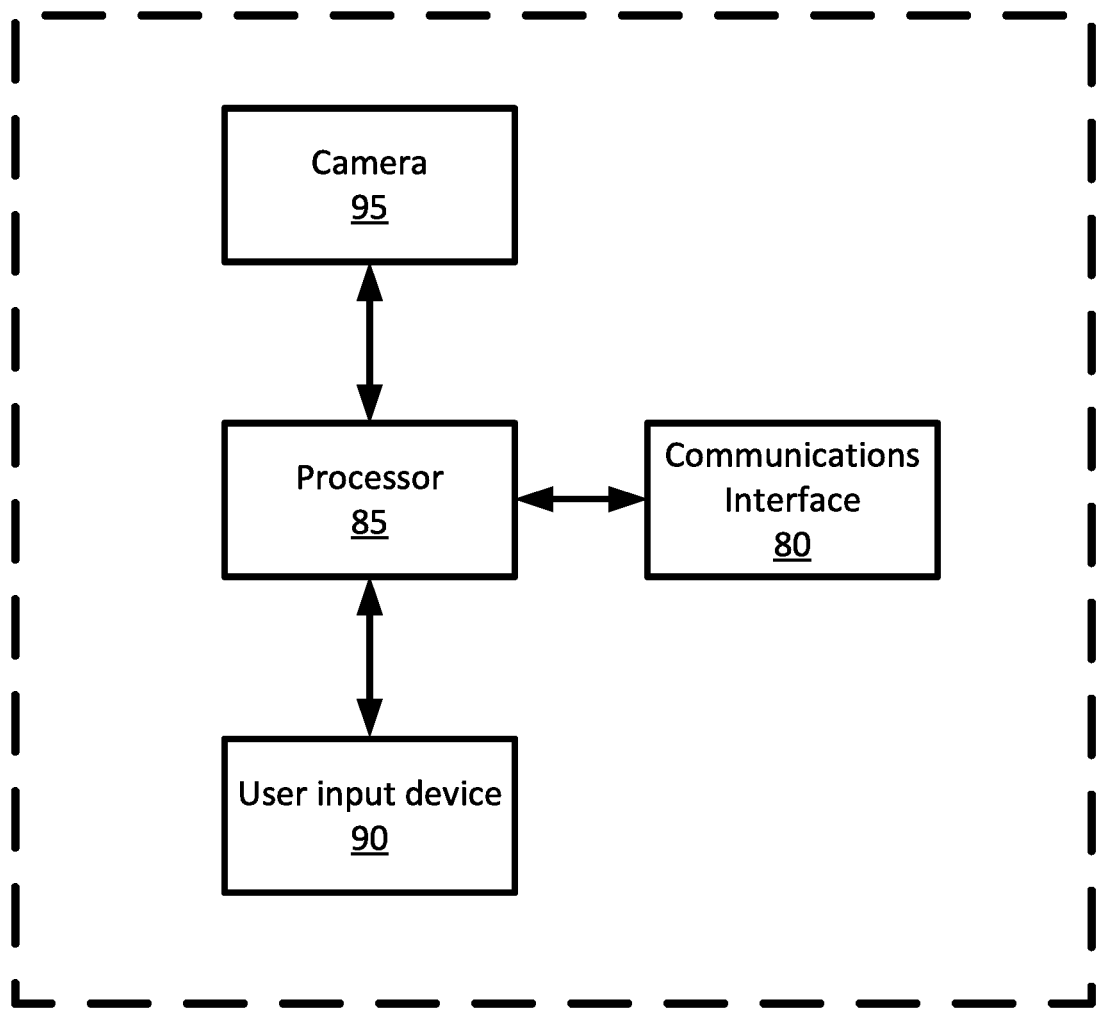
FIG. 3 is a block diagram of a content generating device to generate content based on a request received from a requesting device.

Referring to FIG. 3, an example of a content generating device to work in cooperation with the apparatus 10 to generate and distribute content to the requesting device 50 is generally shown at 75. The content generating device 75 may include additional components, such as various interfaces to communicate with other devices, and further input and output devices to interact with a user or account holder associated with the content generating device 75. In the present example, the content generating device 75 may be any type of electronic device capable of recording and content, such as a smartphone, a tablet, a laptop, a desktop computer, a camera, a video record, a microphone, or any other device capable of receiving input data from an environment to be used to product content. The content may be produced using an automated process by converting the input data received by the camera 95 to content. In other examples, the input data may be edited by a user of the content generating device 75 to produce the content. The content generating device 75 includes a communications interface 80, a processor 85, a user input device 90, and a camera 95.

The communications interface 80 is to communicate with other devices on a network, such as the apparatus 10. The manner by which the communications interface 80 receives and sends data is not particularly limited. In the present example, the communications interface 80 performs similar functions in the content generating device 75 as the communications interface 15 performs in the apparatus 10, and the communications interface 55 in the requesting device 50. The data exchanged via the communications interface 80 is also not particularly limited and may include receiving a request for content and transmitting a response to the request which may include the content requested.

In the present example, the processor 85 may include a central processing unit (CPU), a graphics processing unit (GPU), a microcontroller, a microprocessor, a processing core, a field-programmable gate array (FPGA), an application-specific integrated circuit (ASIC), or similar. The processor 85 may execute various instructions either stored on a local memory storage unit (not shown) or received via the communications interface 80 from an external memory source, such as a cloud server. The processor 85 may execute instructions to carry out processes such as handling requests, recording input data from the camera 95 and generating content based on the input.

The user input device 90 is to receive input from a user, which may include various control functions associated with the content generating device 75. For example, the user input device 90 may receive input to control the hardware, such as the camera 95 and to adjust various settings to customize the collection of input data. In addition, the user input device 90 may be used to edit the input data received from the camera 95 to produce the content by providing a presentable product to the requesting device 50. It is to be appreciated that the type of user input received via the user input device 90 is not particularly limited. For example, the user input device 90 may be a device to interact with a user, such as a keyboard, a pointer device, a touch sensitive device, a button, a microphone, or any other device to generate control signals in response to the actions of a user. In some examples, the user input device 90 may be the touch sensitive portion of a display (not shown) to provide a touchscreen interface.

In further examples, the user input device 90 may be another communications interface to communicate with a connected device or a network, such as the Internet, where user input is received from another electronic device. For example, the content generating device 75 may a remotely controlled device such as a robot or a drone with a camera 95. In such an example, the content generating device 75 may be controlled via a wireless signal generated from a controller or other electronic device.

The camera 95 is to collect input data in the form of images or videos. The camera 95 is not particularly limited and the manner by which the camera 95 collects data is not limited. For example, the camera 95 may include various optical components to focus light onto an active pixel sensor having a complementary metal oxide semiconductor to detect light signals. In other examples, the optics may be used to focus light onto a charged coupled device.

It is to be appreciated by a person of skill with the benefit of this description that the camera 95 may be substituted with another input device where the content requested by the user is not a conventional image or video. For example, in cases where the content requested is for audio content, the camera 95 may be substituted with a microphone.

Figure 4:
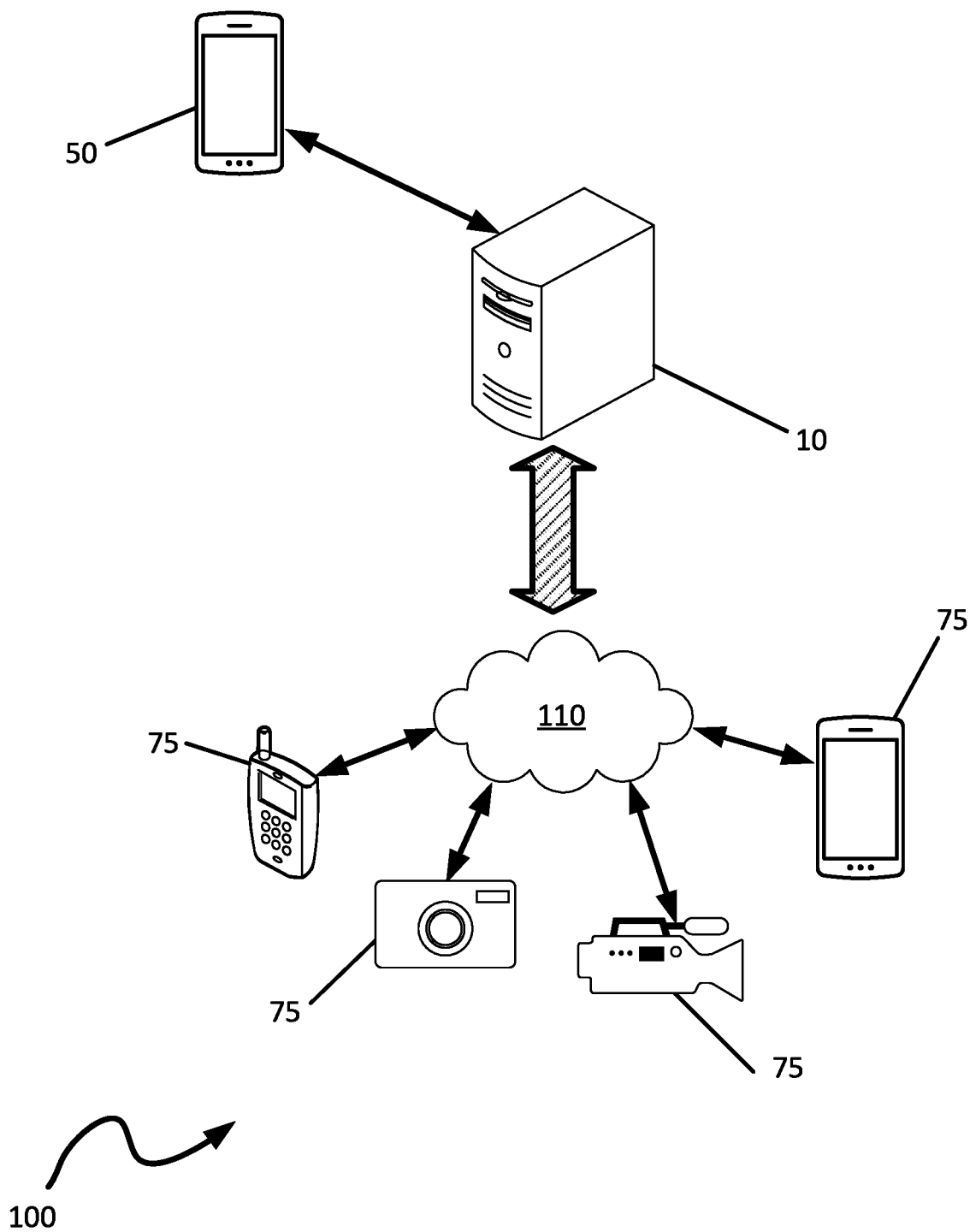
FIG. 4 is a representation of an example system to connect devices to an apparatus to distribute content from a content generating device to a receiving device.

Referring to FIG. 4, an example of a system 100 of various devices is generally shown. In the present example system 100, the apparatus 10 is in communication with a requesting device 50 and with a plurality of content generating devices 75 via a network 110. In this example, the requesting device 50 is connected to the apparatus 10 via another communication link separate from the network 110. However, in other examples, the requesting device 50 may connect to the apparatus 10 via the network 110 in the same manner that the content generating devices 75 connect to the apparatus 10. It is to be appreciated by a person of skill that the network 110 is not particularly limited and may be any wired or wireless network connecting the content generating devices 75 to the apparatus 10. For example, the network 110 may be the Internet to connect the content generating devices 75 and apparatus 10. In other examples, the network 110 may be an intranet or other type of closed and/or private network.

Figure 5:
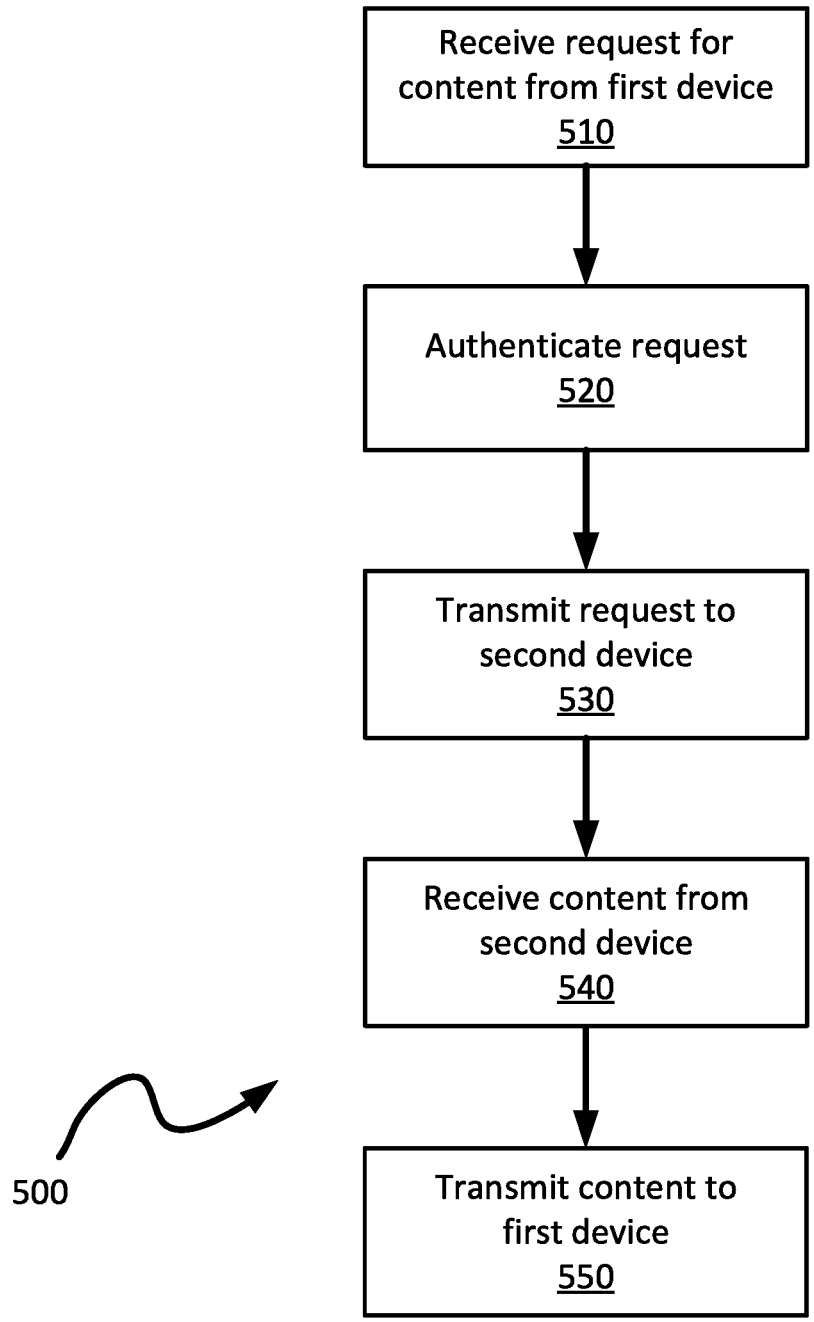
FIG. 5 is a flowchart of an example method of requesting content and receiving content from a content generating device.

Referring to FIG. 5, a flowchart of an example method of connecting devices to distribute content from one device to another is generally shown at 500. In order to assist in the explanation of method 500, it will be assumed that method 500 may be performed by the apparatus 10 in the system 100. Indeed, the method 500 may be one way in which the apparatus 10 along with the requesting device 50 and the content generating device 75 may be configured. Furthermore, the following discussion of method 500 may lead to a further understanding of the system 100 and it components. In addition, it is to be emphasized, that method 500 may not be performed in the exact sequence as shown, and various blocks may be performed in parallel rather than in sequence, or in a different sequence altogether.

Beginning at block 510, a request is received from a requesting device 50 for content. In the present example, the request may be a data message having details about the content requested as well as identifying parameters to identify the source of the request. The details of the content requested is not particularly limited and may include features of the desired content or other parameters describing what the user of the requesting device 50 is looking for. In addition, the request may also include information about an account of the subscription service associated with the requesting device. For example, the request received from the requesting device 50 many include identifiers to indicate that the requesting device 50 is associated with an account with the ability to make the request through the subscription service. The request may also include a description of the content being requested and information regarding payment to a content producer to provide the content being requested.

Block 520 comprises authenticating the request received at block 510. The manner by which the request is authenticated is not particularly limited. For example, the request may be authenticated to confirm that the requesting device 50 is associated with a valid account of the subscription service or that the account has sufficient permissions and/or credits to purchase the content being requested.

As a specific example, the request received at block 510 may include a description of an event as well as a geographical location or vantage point from which the an image or video of the event is to be captured. The request may also include information about how much compensation the requesting device is offering for the content. The compensation may be a specified amount of credits. Accordingly, the request may authenticated by processing the information and verifying the information with the record associated with the requesting device 50. In some examples, the record associated with the requesting device 50 may have some limitations such as a parental locking feature to reduce inappropriate content from being provided to minors or hardware limitations of the account holder that is only authorizes to request photos of a certain resolution. Other limitations that a record associated with the requesting device 50 may include are geographical limitations or restrictions to specific content generating devices 75. It is to be appreciated that the limitations may also be in place to conserve resources for other membership types which may have priority to content generating devices 75 having higher quality hardware.

Block 530 comprises transmitting the request received at block 510 to a content generating device 75. This process may also involve the selection of the content generating device 75 to which the request is to be transmitted. For example, the selection process may be carried out by a selection engine 35 as described previously.

In other examples, the request may be transmitted or broadcasted to a plurality of content generating devices 75 where a selection may be made based on the responses received from the plurality of content generating devices 75. For example, the first response received from the plurality of content generating devices 75 may be awarded the task of generating the requested content. In other examples, the response from each content generating device 75 may include a bid or counter-bid to provide the content. In such an example, the content generating device 75 may be selected based on the value of the bid to maximize the value for either the account associated with the requesting device 50 or the account associated with the content generating device 75. In particular, the lowest bid or counter-bid received in response to block 530 to provide the most value for the requesting device 50. On the other hand, the highest bid or counter-bid received in response to block 530 may be automatically selected to provide the most value for the content generating device 75. The original request received at block 510 may include a maximum value the user of the requesting device 50 is willing to pay. Therefore, the content generating device 75 from the plurality of content generating devices 75 providing the response with the highest bid or counter-bid equal to or less than the cap received at block 510 may be selected to increase value for the content generating device 75 within the parameters provided in the original request.

Block 540 involves receiving the requested content from the content generating device 75. In the present example, the apparatus 10 may select the content generating device 75 from the plurality of content generating devices 75 prior to receiving the content. Once the apparatus 10 received the content, the content is subsequently transmitted to the requesting device 50 at block 550. It is to be appreciated by a person of skill with the benefit of this description that in this example, the apparatus 10 may act as a proxy. By acting as a proxy, the apparatus 10 may protect the identities of the users of the requesting device 50 and the users of the content generating device 75. In addition, the apparatus 10 may store content on the memory storage unit 25 for subsequent retrieval or to build a library of content for subsequent re-distribution.

Figure 6:
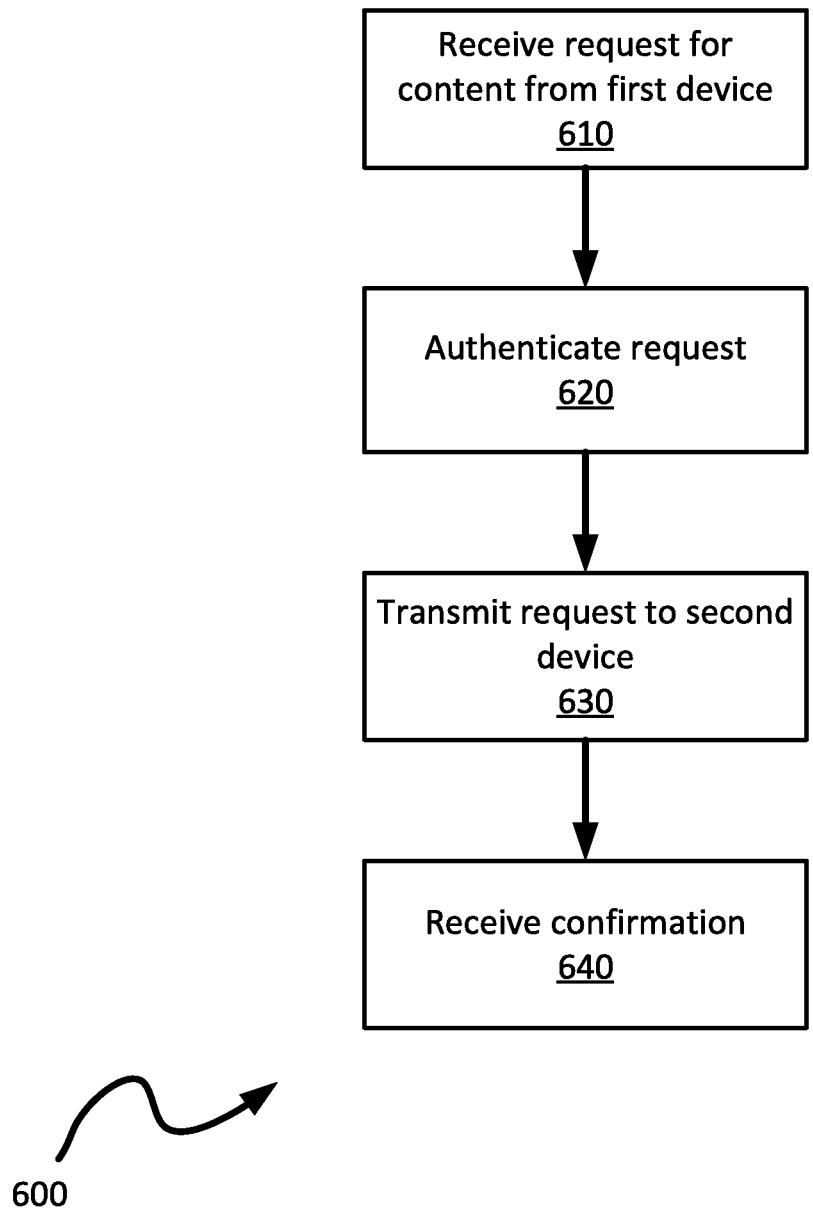
FIG. 6 is a flowchart of another example method of requesting content and receiving content from a content generating device.

Referring to FIG. 6, a flowchart of another example method of connecting devices to distribute content from one device to another is generally shown at 600. In order to assist in the explanation of method 600, it will be assumed that method 600 may be performed by the apparatus 10 in a system where the apparatus 10, the requesting device 50, and the content generating device 75 are all connected to a network where each of the apparatus 10, the requesting device 50, and the content generating device 75 may communicate with each other directly. Indeed, the method 600 may be one way in which the apparatus 10 along with the requesting device 50 and the content generating device 75 may be configured. In addition, it is to be emphasized, that method 600 may not be performed in the exact sequence as shown, and various blocks may be performed in parallel rather than in sequence, or in a different sequence altogether.

Beginning at block 610, a request is received from a requesting device 50 for content. The manner by which the request is received is not particularly limited and may be substantially similar to the operation of block 510 discussed above.

Block 620 comprises authenticating the request received at block 610. The manner by which the request is received is not particularly limited and may be substantially similar to the operation of block 520 discussed above.

Block 630 comprises transmitting the request received at block 610 to a content generating device 75 in a similar manner as described above in relation to block 530.

Block 640 involves receiving a confirmation that the content has been generated and/or sent to the requesting device 50. In the present example, the content generating device 75 may directly communicate with the requesting device 50 to provide the content without involving the apparatus 10. Accordingly, one or both of the content generating device 75 and the requesting device 50 may provide a confirmation message to the apparatus 10 for record keeping purposes.

In some examples, upon receiving the confirmation at block 640, the apparatus 10 may update the records associated with users of the content generating device 75 and the requesting device 50. In particular, the administration engine 20 of the apparatus 10 may transfer credits from the record associated with the requesting device 50 to the record associated with the content generating device 75 to complete the transaction.

Figure 7:
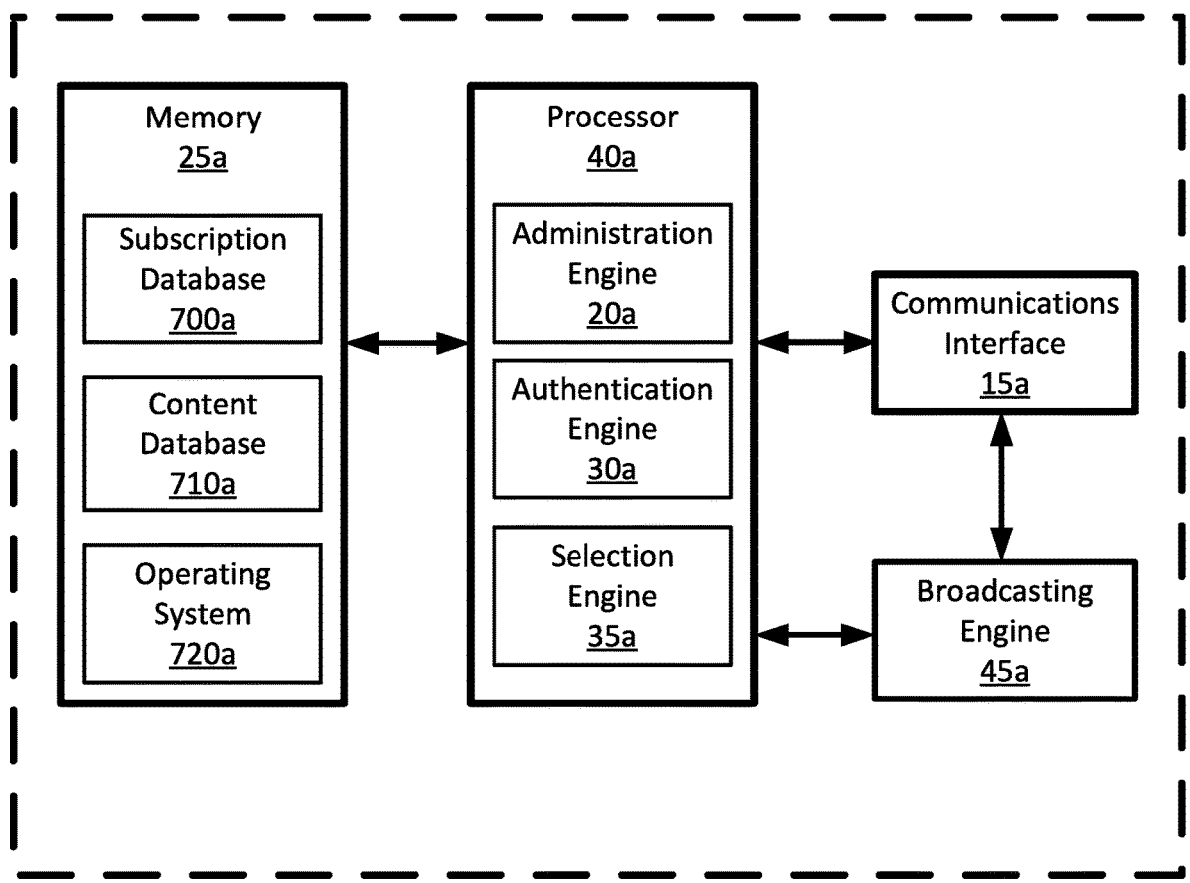
FIG. 7 is a block diagram of another example apparatus to connect devices to distribute content from one device to another.

Referring to FIG. 7, another example an apparatus to connect devices to distribute content from one device to another is generally shown at 10a. Like components of the apparatus 10a bear like reference to their counterparts in the apparatus 10, except followed by the suffix "a". The apparatus 10a includes a communications interface 15a, a memory storage unit 25a, a processor 40a, and a broadcasting engine 45a. In the present example, an administration engine 20a, an authentication engine 30a, a selection engine 35a are implemented by the processor 40a. In other examples, the broadcasting engine 45a may also be implemented by the processor 40a instead of as a separate stand-alone component of the apparatus 10 as shown in FIG. 7.

The processor 40a may include a central processing unit (CPU), a graphics processing unit (GPU), a microcontroller, a microprocessor, a processing core, a field-programmable gate array (FPGA), an application-specific integrated circuit (ASIC), or similar. The processor 40a and the memory storage unit 25a may cooperate to execute various instructions. In the present example, the processor 40a may execute instructions stored on the memory storage unit 25a to implement the administration engine 20a, the authentication engine 30a, and the selection engine 35a. In other examples, the administration engine 20a, the authentication engine 30a, and the selection engine 35a may each be executed on a separate processor. In further examples, the administration engine 20a, the authentication engine 30a, and the selection engine 35a may be operated on a separate machine, such as from a software as a service provider or in a virtual cloud server.

The memory storage unit 25a is to store various data and information on the apparatus 10a. The components of the memory storage unit 25a are not particularly limited. For example, the memory storage unit 25a may include a non-transitory machine-readable storage medium that may be, for example, an electronic, magnetic, optical, or other physical storage device. In addition, the memory storage unit 25a may store an operating system 720a that is executable by the processor 40a to provide general functionality to the apparatus 10a. The memory storage unit 25a may additionally store instructions to operate at the driver level as well as other hardware drivers to communicate with other components and peripheral devices of the apparatus 10a.

In the present example, the memory storage unit 25a may also include a subscription database 700a for storing records of accounts associated with requesting devices and content generating devices. It is to be appreciated that the records of accounts may be associated with users or with a physical device. However since most of the requesting devices and content generating devices are typically personal electronic devices, each device may be generally associated with a single human user. The records stored in the subscription database 700a may include information such as a balance of credits available on an account for use to purchase content. The information in the subscription database 700a may also include data related to permissions of various accounts on the subscription service as well as peer ratings or reviews. It is to be appreciated that the permissions and/or credit balance of each account in the subscription database 700a may be used to connect account holders seeking content, such as videos or images, with other account holders interested in producing content, such as amateur or professional photographers and filmmakers. The information in the subscription database 700a may be used to restrict or limit some account holder from others, either based on a rule of the subscription service or by one account holder blocking another account holder manually.

In addition, the memory storage unit 15a may also include a content database 710a to receive and store content from a content generating device. It is to be appreciated that the content database 710a is not limited and may also be used as temporary storage for content to be passed from the content generating device to the requesting device. Furthermore, the content stored in the content database may be anonymized such that identifying portions, such as metadata or watermarks, are restricted or removed such that they are not transmitted to the requesting device to maintain confidentiality. Accordingly, by not transmitting the identifying portions of the content, confidentiality between the different account holders may be maintained.

In the present example, the broadcasting engine 45a may be used to broadcast a request received from the requesting device to a plurality of content generating devices. Accordingly, by broadcasting the request, the apparatus 10 may effectively solicit bids from various content producers to complete the request. In the some examples, the request broadcasted to the plurality of content generating devices may be modified with the broadcasting engine 45 to remove identifying information to maintain confidentiality of the requesting device.

In response to the broadcasted request from the broadcast engine 45a, the content generating devices may each provide a response to be received by the apparatus 10a via the communications interface 15a. The type of response accepted by the apparatus 10a is not particularly limited. As an example, the apparatus 10a may simply accept a binary response whether the content generating device transmitting the response is willing to fulfil the request from the requesting device. In this example, the first acceptance from a content generating device may be awarded the task of fulfilling the request in accordance with the details provided therein, such as the description of the content and the price that the requesting device is willing to pay. In other examples, the apparatus 10a may wait a predefined period of time, such as a minute, an hour, a day, etc. to allow for as many content generating devices to respond as possible.

Alternatively, the apparatus 10a may wait until a predetermined number of responses has been received. By collecting a plurality of responses, the apparatus 10a may present the responses to the requesting device where the requesting device may be prompted to make a selection of the content generating device. It is to be appreciated that in some examples, the selection may be based on additional information received in the response, such as a history, user reviews, or portfolio associated with the content generating device.

In further examples, the response from the content generating devices may also include a bid for carrying out the generation of the content requested. In examples where the originating request includes a bid from the requesting device, the response may include a counter-bid. The counter-bid is not limited and may be higher or lower than the original bid from the requesting device. For example, if the original bid is high, the user of the content generating device may counter-bid with a lower amount to provide a more competitive response compared with other content generating devices that may provide a response. Alternatively, if the original bid is too low, the user of the content generating device may counter-bid with a higher amount to cover costs associated with generating the content, such as travel. In some examples, the apparatus 10a may automatically select the content generating device based on the bid value in the response. For example, the apparatus 10a may select the highest bid to obtain better value for the content generating device or the lowest bid to obtain better value for the requesting device depending if the apparatus 10a is designed to be biased in favor of one party over the other. In other examples, the apparatus 10a may randomly select a content generating device to fulfill the request.

Figure 8:
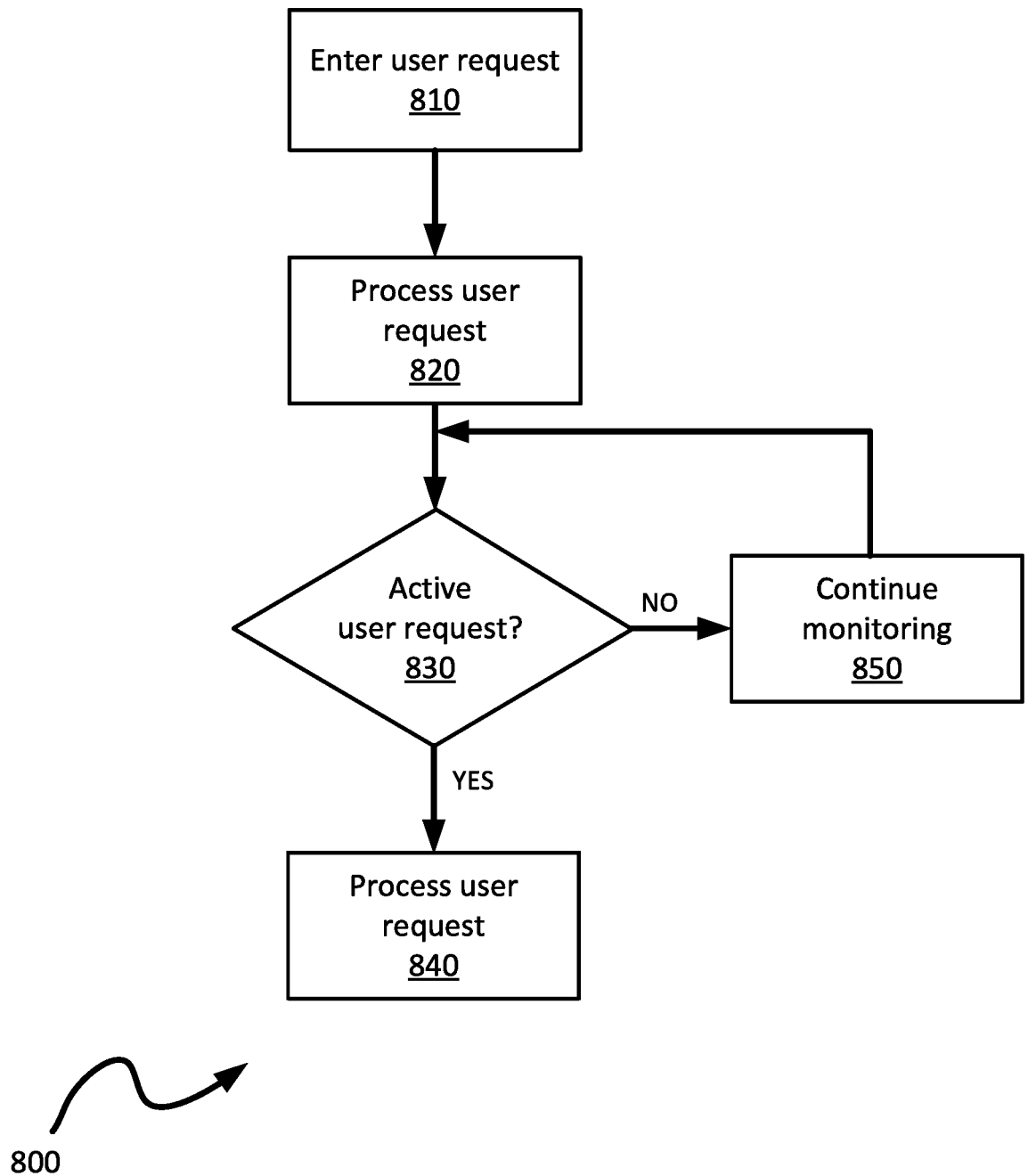
FIG. 8 is a flowchart of an example method of requesting content.

Referring to FIG. 8, a flowchart of an example method of requesting content is generally shown at 800. In order to assist in the explanation of method 800, it will be assumed that method 800 may be performed by the system 100. Indeed, the method 800 may be one way in which the system 100 may operate. It is to be emphasized, that method 800 may not be performed in the exact sequence as shown, and various blocks may be performed in parallel rather than in sequence, or in a different sequence altogether.

Beginning at block 810, a user of the requesting device 50 may initiate a request. The manner by which the request is initiated is not particularly limited and may involve selecting a button or option in an application to begin the request. The user of the requesting device may then provide further details of the request, such as the content type (e.g. live stream, recorded video, or image data), location, time of content capture, subject of the content, or any other additional details to provide guidance to the generation of the content.

Block 820 comprises processing the request received at block 810 at the apparatus 10. Once the request has been processed, the request is forwarded to one or more content generating devices 75.

The content generating device 75 may constantly run a check at block 830 to determine if any requests are active and available to the content generating device 75. In the present example, an active request is a requested from a requesting device 50 that the content generating device 75 is qualified to fulfil. As discussed above, not all requests may be fulfilled by every content generating device due to potential physical device limitations and/or account limitations of the user of the content generating device 75. If no active requests are available, the process proceeds to block 850 where the content generating device 75 is to continue the monitoring process. Alternatively, if block 830 determines an active request is available to the content generating device 75, the method 800 proceeds to block 840 where the request from the requesting device 50 is processed.

The manner by which the request is processed by a user of the content generating device 75 is not particularly limited. For example, the user of the content generating device 75 may initially select the request from a plurality of active requests if more than one active request is available. The user of the content generating device 75 may then accept or decline the request after reviewing the specific details of the request. If the request is declined, the process is terminated. Alternatively, if the requested is accepted, the user of the content generating device 75 is to carry out the request from the requesting device 50. As another option, the user of the content generating device 75 may also edit the request and send it back to the requesting device 50 as a counteroffer or bid where the user of the requesting device 50 may accept, decline, or further modify the counteroffer.

Figure 9:
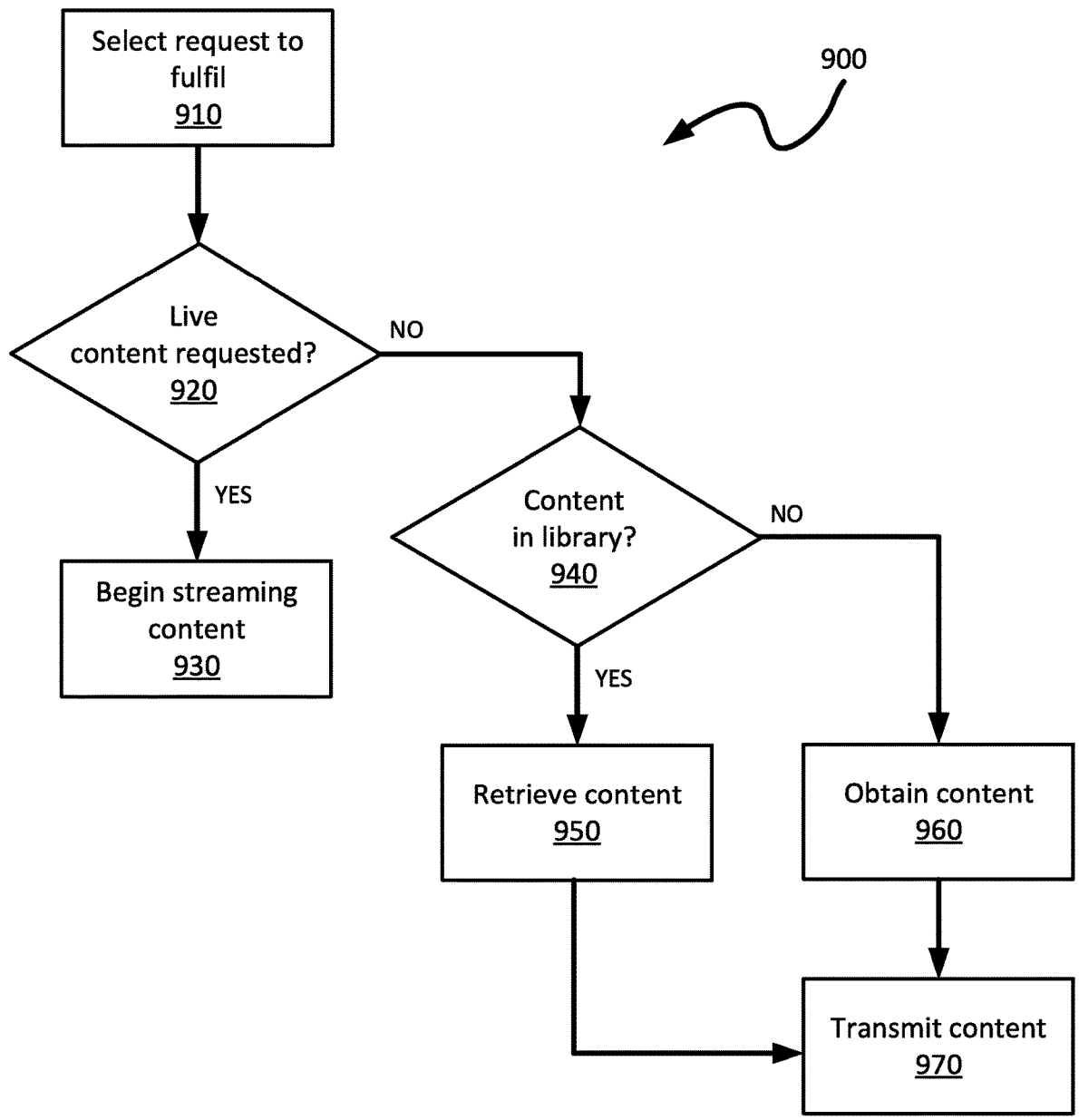
FIG. 9 is a flowchart of an example method of content generation and uploading.

Referring to FIG. 9, a flowchart of an example method of content generation and uploading is generally shown at 900. In order to assist in the explanation of method 900, it will be assumed that method 900 may be performed by the content generating device 75. Indeed, the method 900 may be one way in which the content generating device 75 may operate. It is to be emphasized, that method 900 may not be performed in the exact sequence as shown, and various blocks may be performed in parallel rather than in sequence, or in a different sequence altogether.

Beginning at block 910, an active request for content from the requesting device 50 may be selected by the user of the content generating device 75 for fulfilment. The manner by which the request is selected is not particularly limited and may involve selecting a button or option in an application running on the content generating device 75.

Block 920 determines if live content is requested. If the request received from the requesting device 50 is for live content, the user of the content generating device 75 may begin to stream the live content at block 930. A notification may also be sent to the requesting device 50 to begin receiving the feed upon receiving payment from the requesting device 50.

In the case where the requested content is not for live content, the method 900 proceeds to block 940 where the content generating device 75 determines if the content requested is in a library. The library may be a local library on the content generating device 75, such as a camera roll of a smartphone, or the library may be on the memory storage unit 25 of the apparatus 10 or another server, such as a cloud server (not shown). If the content is in the library, the content is retrieved at block 950 and transmitted to the requesting device 50 at block 970. If the content is not in the library, the user of the content generating device 75 may obtain the content at block 960 and subsequently transmit the content to the requesting device 50 at block 970. It is to be appreciated that the manner by which the content is obtained is not limited and may involve the user of the content generating device 75 capturing the content with the camera 95. Alternatively, the user of the content generating device 75 may also obtain the content from another source or library that is not accessible to the requesting device 50. In this example, the content generating device 75 may act as an intermediary for the requesting device 50 to provide content from libraries that are not available to the user of the requesting device 50.

Figure 10:
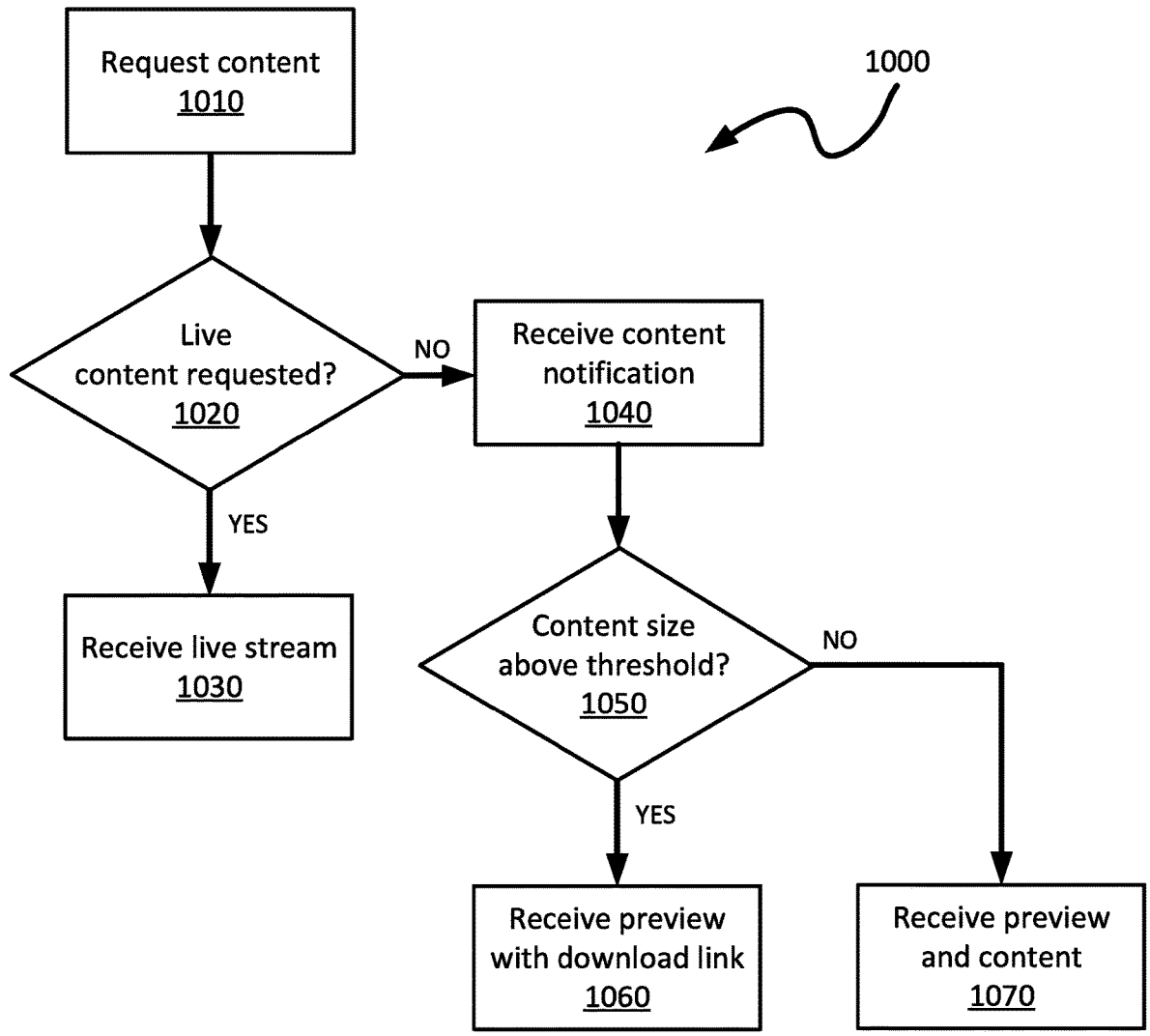
FIG. 10 is a flowchart of another example method of content generation and uploading.

Referring to FIG. 10, a flowchart of an example method of content generation and uploading is generally shown at

1000. In order to assist in the explanation of method 1000, it will be assumed that method 1000 may be performed by the requesting device 50. Indeed, the method 1000 may be one way in which the requesting device 50 may operate. It is to be emphasized, that method 1000 may not be performed in the exact sequence as shown, and various blocks may be performed in parallel rather than in sequence, or in a different sequence altogether.

Beginning at block 1010, a user of the requesting device 50 may initiate a request. The manner by which the request is initiated is not particularly limited and may involve selecting a button or option in an application to begin the request. The user of the requesting device 50 may then provide further details of the request, such as the content type (e.g. live stream, recorded video, or image data), location, time of content capture, subject of the content, or any other additional details to provide guidance to the generation of the content.

Block 1020 determines if live content is requested. If the request is for live content, the requesting device 50 may begin to receive a live stream at 1030 if connected to a content generating device 7 via the apparatus 10. For example, a notification may be received from the content generating device 75 that the live stream is ready to be sent to the requesting device 50 upon transfer of a payment to the content generating device 75.

In the case where the requested content is not for live content, the method 1000 proceeds to block 1040 where the requesting device 50 waits for a notification from the content generating device 75 that the content requested is available for retrieval. Upon receipt of the notification, the method 1000 proceeds to block 1050 where a determination is made regarding the size of the content relative to a predetermined threshold value. The predetermined threshold value is not particularly limited. In the present example, the threshold value may be set at an amount that would be reasonably downloaded onto a portable electronic device such as a smart phone or tablet. For example, the threshold value may be 100 MB, 500 MB, or 1.0 GB.

If the content is larger than the predetermined threshold, the method 1000 proceeds to block 1060 where a preview is provided as well as a link is to download the content in its entirety. The link may be downloaded from any device including the requesting device 50. By downloading the content from an external server, it is to be appreciated that this will free up computational resources at the content generating device 75 since it is not involved with the file transfer.

Alternatively, if the content is within the predetermined threshold, the method 1000 proceeds to block 1070 where preview is provided and the content is directly forwarded to the requesting device 50, where a user may watch it directly or add to the camera roll for subsequent viewing.

It should be recognized that features and aspects of the various examples provided above may be combined into further examples that also fall within the scope of the present disclosure.

What is claimed is:

1. An apparatus comprising:
   a communication interface to communicate with a first device and a second device, wherein the first device is to request content, and wherein the second device is to generate the content;
   an administration engine to manage a subscription service, wherein the first device and the second device are part of the subscription service;
   a memory storage unit to store a first record associated with the first device and a second record associated with the second device;
   an authentication engine to authenticate a request from the first device for content based on the first record; and
   a selection engine to select the second device based on the request, wherein the second device is to generate the content and to transmit the content to the first device.

2. The apparatus of claim 1, further comprising a broadcasting engine to broadcast the request to a plurality of content generating devices.

3. The apparatus of claim 2, wherein the selection engine is to receive a response to the request from each content generating device of the plurality of content generating devices.

4. The apparatus of claim 3, wherein the response includes a bid to provide the content.

5. The apparatus of claim 4, wherein the selection engine is to select the second device from the plurality of content generating devices with a lowest bid.

6. The apparatus of claim 4, wherein the selection engine is to present the response from each content generating device to the first device and to prompt the first device for a selection of the second device.

7. The apparatus of claim 1, wherein the administration engine is to update the first record and the second record after the content is delivered from the second device to the first device.

8. The apparatus of claim 1, further comprising a content database to receive and to store the content from the second device, wherein the content is to be transmitted from the content database to the first device.

9. The apparatus of claim 8, wherein the content database restricts access to information about the first device from the second device to maintain confidentiality.

10. A method comprising:
    receiving, from a first device, a request for content;
    authenticating, at an authentication engine, the request from the first device for the content based on a first record, wherein the first record is associated with a subscription service and the first device;
    transmitting, upon authentication by the authentication engine, the request to a second device, wherein the second device is to generate the content;
    receiving the content from the second device; and
    transmitting the content to the first device.

11. The method of claim 10, further comprising updating the first record after the content is transmitted to the first device from the second device.

12. The method of claim 10, wherein transmitting the request to the second device comprises broadcasting the request to a plurality of devices, wherein the second device is selected from the plurality of devices.

13. The method of claim 12, further comprising receiving, from each device of the plurality of devices, a response to the request.

14. The method of claim 13, wherein the second device is selected from the plurality of devices based on the response from each device of the plurality of devices.

15. The method of claim 10, further comprising storing the content received from the second device in a memory storage unit to build a library of content.

16. A method comprising:
    receiving, from a first device, a request for content;
    authenticating, at an authentication engine, the request from the first device for the content based on a first record, wherein the first record is associated with a subscription service and the first device;

transmitting, upon authentication by the authentication engine, the request to a second device, wherein the second device is to generate the content; and receiving a confirmation message that the first device has received the content.

17. The method of claim 16, wherein the confirmation message is received from the second device.

18. The method of claim 16, wherein the confirmation message is received from the first device.

19. The method of claim 16, wherein transmitting the request to the second device comprises broadcasting the request to a plurality of devices, wherein the second device is selected from the plurality of devices.

20. The method of claim 19, further comprising receiving, from each device of the plurality of devices, a response to the request.

* * * * *